United States Patent [19]

Okuda et al.

[11] Patent Number: 5,759,245
[45] Date of Patent: Jun. 2, 1998

[54] EMULSION INK FOR STENCIL PRINTING

[75] Inventors: Sadanao Okuda; Masato Ishikawa; Takashi Suzuki; Yoshihiro Hayashi, all of Ibaraki-ken, Japan

[73] Assignee: Riso Kagaku Corporation, Tokyo, Japan

[21] Appl. No.: 806,077

[22] Filed: Feb. 25, 1997

[30] Foreign Application Priority Data

Feb. 26, 1996 [JP] Japan .................. 8-063807

[51] Int. Cl.$^6$ .................. C09D 11/02
[52] U.S. Cl. .................. 106/31.26; 106/31.65
[58] Field of Search .................. 106/31.26, 31.65

[56] References Cited

U.S. PATENT DOCUMENTS

| | | | |
|---|---|---|---|
| 2,839,412 | 6/1958 | Igler et al. | 106/31.26 |
| 3,823,020 | 7/1974 | Gilson et al. | 106/31.41 |
| 5,389,130 | 2/1995 | Batlaw et al. | 106/31.26 |
| 5,395,435 | 3/1995 | Mizobuchi | 106/31.26 |
| 5,574,578 | 11/1996 | Okuda | 106/31.26 |
| 5,575,839 | 11/1996 | Okuda | 106/31.26 |
| 5,609,670 | 3/1997 | Okuda et al. | 106/31.26 |

FOREIGN PATENT DOCUMENTS

| | | |
|---|---|---|
| 0 042 355 A1 | 12/1981 | European Pat. Off. . |
| 0 661 356 A1 | 7/1995 | European Pat. Off. . |
| 0 694 595 A1 | 1/1996 | European Pat. Off. . |
| 0 726 300 A1 | 8/1996 | European Pat. Off. . |
| 61-255967 | 11/1986 | Japan . |
| 1-14284 | 1/1989 | Japan . |
| 4-132777 | 5/1992 | Japan . |
| 5-117565 | 5/1993 | Japan . |
| 7-188598 | 7/1995 | Japan . |

*Primary Examiner*—Helene Klemanski
*Attorney, Agent, or Firm*—Cushman Darby & Cushman IP Group of Pillsbury Madison & Sutro LLP

[57] ABSTRACT

An water-in-oil (W/O) emulsion ink for stencil printing is provided, which is excellent in emulsion stability. The water-in-oil (W/O) emulsion ink has an oil phase and a water phase, in which a water-insoluble colorant is contained in said water phase, and said water-insoluble colorant comprises an insoluble azo pigment. The insoluble azo pigment contained in the water phase preferably has an average particle size of 1 μm or less. The emulsion ink is preferably formed by use of an emulsifier having an HLB of 1.5–6.0, and the water phase preferably has a maximum particle diameter of 10 μm or less.

6 Claims, No Drawings

EMULSION INK FOR STENCIL PRINTING

The present invention relates to an emulsion ink for stencil printing, and more specifically relates to an emulsion ink which is excellent in emulsion stability.

Stencil printing is effected by perforating a stencil sheet to make a master, and passing inks through the perforated portions of the master to an article to be printed such as printing paper. Since the master is easy to make, stencil printing is utilized in a wide range of fields.

Conventional inks for stencil printing are usually water-in-oil (W/O) emulsion inks which contain pigments as colorants in the oil phase thereof, as disclosed in Japanese Patent Laid-open (Kokai) Nos. 255967/86, 14284/89, 132777/92 and 117565/93. Once this type of W/O emulsion inks are printed on an article such as printing paper to be printed, the oil phase, which is the outer phase of emulsion, first permeates the printed article, and then the water phase, which is the inner phase of emulsion, permeates the printed article and/or evaporates therefrom, because the oil phase is higher in permeability and lower in surface tension than the water phase. Since the conventional W/O emulsion inks contain pigments in the oil phase, the inks take much time to permeate and dry. Also, due to the pigments contained the oil phase, permeation of the pigments occurs concurrently with the permeation of the oil phase, and as a result, the inks often have a problem on seep through because pigments permeate into the printed article deeply. Similarly, this phenomenon of permeation occurs on a surface of paper, causing inks to spread on the surface of the paper and blurring the printing.

In order to overcome such disadvantages as mentioned above, a W/O emulsion ink has been suggested, in which water-insoluble colorants are dispersed in the water phase thereof, as disclosed in Japanese Patent Laid-open (Kokai) No. 188598/95. However, the present inventors have found that some organic pigments as water-insoluble colorants are too hydrophilic, and thus if such hydrophilic organic pigments are added to the water phase, emulsion stability is lowered, and if such pigments have a large particle size, the water phase dispersed in the oil phase also increases in particle size, thereby reducing emulsion stability.

On the basis of the above finding, an object of the present invention is to provide a water-in-oil (W/O) emulsion ink for stencil printing, which has a water-insoluble colorant dispersed in the water phase thereof, and is improved in emulsion stability, namely has little change in morphology.

According to the present invention, the above object is attained by a water-in-oil (W/O) emulsion ink for stencil printing, having an oil phase and a water phase, in which a water insoluble colorant is contained in the water phase, the colorant comprising an insoluble azo pigment.

In other words, the present water-in-oil (W/O) emulsion ink contains an insoluble azo pigment as a water-insoluble colorant in the water phase. Compared with soluble azo pigments (azo lakes), the insoluble azo pigment has in its molecule no water soluble group, and thus is considered to be stably present in the water phase of the emulsion and keep the emulsion stable with little change in viscosity even when it is left for a long time. The reason for this is not clear, but is assumed that if water soluble groups, namely polar functional groups are contained in the water phase, these groups are adsorbed by the interface between the oil phase and the water phase to affect the equilibrium of the two phases, thereby lowering the stability of the emulsion.

When soluble azo pigments (azo lakes) are used, emulsion inks can not be kept stable for a long time, causing destruction or separation of emulsion into oil and water, and transfer of soluble azo pigments (azo lakes) from the water phase to the oil phase. According to the present water-in-oil (W/O) emulsion ink, insoluble azo pigments are stably present as water-insoluble colorants in the water phase. Thus, insoluble azo pigments of the present ink tend to stay on the surface of printed articles such as printing paper, thereby yielding prints with high printing density and little seep through. Although spreading of inks is usually caused on the surface of printing paper by capillary phenomena, the present invention first allows the oil phase to permeate and prevents the water phase with colorants from permeating into the area that has been permeated by the oil phase, so that blurring of printing can be reduced.

Insoluble azo pigments, which are added as water-insoluble colorants to the water phase according to the present invention, include monoazo or disazo insoluble azo pigments based on betanaphthol, Naphthol AS or acetoacetanilide, monoazo or disazo insoluble azo pigments based on pyrazolones, disazo condensation pigments, and the like. These water-insoluble colorants are used to give colors of yellow, orange, red, violet, brown and the like to articles to be printed.

Examples of insoluble azo pigments of yellow include, for example, Fast Yellow G, Fast Yellow GR, Fast Yellow 10G, Fast Yellow,13G, Fast Yellow 5G, Fast Yellow 3, Hanza Yellow R, disazo Yellow AAA, disazo Yellow AAMX, disazo Yellow AAOT, disazo Yellow 5G, disazo Yellow AAOA, disazo Yellow AAPT, Hanza Yellow 4R, disazo Yellow GP, Fast Yellow RN, Fast Yellow GX, disazo Yellow H10G, disazo Yellow HR, condensed azo Yellow 3G, condensed azo Yellow 6G, condensed azo Yellow GR, Fast Yellow FGL, Fast Yellow 10GX, disazo Yellow GGR, disazo Yellow H10GL, disazo Yellow G3R, disazo Yellow DGR, disazo Yellow GRL, condensed azo Yellow GG, disazo Yellow G3R, disazo Yellow DGR, disazo Yellow GRL, condensed azo Yellow GG, disazo Yellow YR, benzimidazolone Yellow H2G, benzimidazolone Yellow H4G, benzimidazolone Yellow H3G, benzimidazolone Yellow HLR, disazo Yellow (166), disazo Yellow (167), disazo Yellow FR, disazo Yellow NBG, disazo Yellow NBK, disazo Yellow GRY, benzimidazolone Yellow H6G, disazo Yellow GRX, benzimidazolone Yellow HG, benzimidazolone Yellow H3R, and the like.

Examples of insoluble azo pigments of orange include, for example, Fast Yellow 3R, orthonitroaniline Orange, dinitroaniline Orange, Permanent Orange G, Dianisidine Orange, Naphthol Orange (22), Naphthol Orange (24), condensed azo Orange 4R, Pyrazolone Orange TMP, benzimidazolone Orange HL, Naphthol Orange (38), benzimidazolone Orange HGL, benzimidazolone Orange H5G, Dianisidine Orange (63), and the like.

Examples of insoluble azo pigments of red include, for example, Para Red, Permanent Red FRR, Permanent Red 4R, Permanent Red R, Permanent Carmine FB, Parachlor Red, Permanent Red F4RH, Permanent Red F4R, Permanent Red FRLL, Naphthol Red FRL, Naphthol Rubin FB, Naphthol Bordeaux FRR, Naphthol Bordeaux FGR, Naphthol Maroon, Naphthol Bordeaux 3R, Naphthol Red M, Toluidine Maroon, Brilliant Fast Scarlet, Naphthol Red RBS, Vulcan Fast Pink GF, Naphthol Red RN, Vulcan Fast Rubin BF, Vulcan Fast Red G, Vulcan Fast Red B, Bordeaux 5B, Dianisidine Red, Naphthol Red FGR, Brilliant Carmine BS, Naphthol Red FG, condensed azo Red BR, Naphthol Carmine FBB, Naphthol Carmine HR, Naphthol Carmine H4B, condensed azo Scarlet R, Naphthol Red F5RK, Naphthol Rubin F6B, Naphthol Red HF4B, Naphthol Red HF3S, benzimidazolone Red HF2B, Naphthol Red F6RK, condensed azo Red B, condensed azo Red G, condensed azo Red 2B, condensed azo Scarlet Red 4RF, and the like.

Examples of insoluble azo pigments of violet include, for example, Naphthol Violet (25), Naphthol Violet (50), and the like.

Examples of insoluble azo pigments of brown include, for example, Naphthol Brown G, condensed azo Brown 5R, benzimidazolone Brown HFR, and the like.

These insoluble azo pigments preferably have an average particle size of 1 μm or less. When the particle size is more than 1 μm, the size of particles of the water phase of the water-in-oil emulsion tends to become large, and emulsion stability is often deteriorated. Addition amount of the water-insoluble colorant is preferably 1–30% by weight, more preferably 3–10% by weight based on the total of the emulsion ink. When it is less than 1% by weight, coloring effect on articles to be printed is insufficient, and when it is more than 30% by weight, fluidity of inks is deteriorated.

Furthermore, it is preferred that ionic surfactants, amphoteric surfactants, nonionic surfactants, polymeric, silicone-containing or fluorinated surfactants, or tertiary amine compounds are contained as dispersants in the water phase of the present emulsion ink, in order to improve wetting, dispersion and the like of the water-insoluble colorant in water.

Among these dispersants, tertiary amine compounds are particularly preferred. By employing tertiary amine compounds as dispersants, the water-insoluble colorant can finely and stably be dispersed in the water phase, qualities or colors of images can be improved by virtue of the fine dispersion of the water-insoluble colorant, and a W/O emulsion ink excellent in emulsion stability can be obtained. When ordinary dispersants which are polymer compounds containing in molecule such functional groups as carboxyl or sulfonic acid groups that adsorb the surface of pigments, are used, the emulsion sometimes tends to be destructed. This would be because such polymer compounds may also be adsorbed by the interface between the oil phase and the water phase to deteriorate stability of the emulsion.

The tertiary amine compound is a compound having in molecule at least one linkage shown in formula (1):

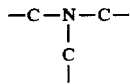
(1)

and includes a polymer compound having a tertiary amine, exemplified as follows:

polyvinyl pyrrolidone shown in formula (2):

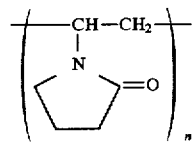
(2)

polyethyleneimine shown in formula (3):

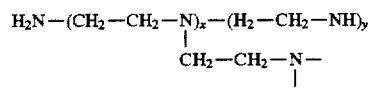
(3)

alkylolamine salts shown in formula (4):

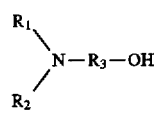
(4)

wherein $R_1$, $R_2$ and $R_3$ are alkyl groups which may be the same or different, and H may be replaced by a metallic ion, and poly-N-acryloylpyrrolidine shown in formula (5):

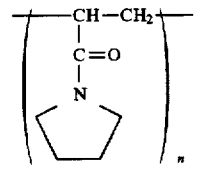
(5)

Addition amount of the tertiary amine compound is not specifically limited. Since the tertiary amine compound is usually a polymer, the more the addition amount is, the greater the thickening effect is. Since dispersants, in such case, only have to be added in a minimum amount to finely and stably disperse the water-insoluble colorant in water, it is preferred that the addition amount is appropriately determined depending upon kinds of dispersants.

Further, the water phase of the present emulsion ink may contain an oil-in-water (O/W) emulsion of resin and/or a water soluble resin. The oil-in-water (O/W) emulsion of resin and/or the water soluble resin can be used to improve not only dispersion of pigments but also fixation of pigments to articles to be printed such as printing paper.

Examples of the O/W emulsion of resin include emulsions of resins such as polyvinyl acetate, copolymers of ethylene and vinyl acetate, copolymers of vinyl acetate and acrylic acid esters, polymethacrylic acid esters, polystyrene, copolymers of styrene and acrylic acid esters, styrene-butadiene copolymers, copolymers of vinylidene chloride and acrylic acid esters, polyvinyl chloride, copolymers of vinyl chloride and vinyl acetate, and polyurethane.

Examples of the water soluble resin include polyvinyl alcohol, methyl cellulose, carboxymethyl cellulose, hydroxyethyl cellulose, polyvinyl pyrrolidone, copolymers of polyethylene and polyvinyl alcohol, polyethylene oxide, polyvinyl ether, polyacrylamide, gum arabic, starch, and water-soluble polyurethane.

Addition amount of the O/W emulsion of resin and/or the water-soluble resin is preferably 1–20% by weight, more preferably 2–10% by weight as solid content based on the total weight of the emulsion ink. If it exceeds 20% by weight, inks form a film on perforations of a stencil sheet and become difficult to pass the perforations when inks are left on the stencil sheet for a long time. If it is less than 1% by weight, the colorant contained in the water phase may not sufficiently be fixed to articles to be printed. Meanwhile, since some of the above surfactants, O/W emulsions of resin and water soluble resins that are added to the water phase have a nature of destructing the W/O emulsion of the ink, great care should be taken upon selection of these additives.

As required, the water phase may further contain other water soluble additives such as wetting agents, electrolytes, antifungal agents, antioxidants, water evaporation inhibiting agents and the like.

In the present invention, the oil phase basically comprises a non-volatile solvent, a volatile solvent, an emulsifier, and the like.

As the non-volatile solvent, can be used mineral oils such as motor oils, spindle oils, machine oils and liquid paraffin, and vegetable oils such as olive oil, castor oil and salad oils. As the volatile solvent, can be used known solvents of the types of mineral oils and vegetable oils. Proportion of non-volatile solvent to volatile solvent (i.e., non-volatile solvent/volatile solvent) varies depending upon blending ratio of the oil phase and the water phase, but is preferably 50 - 95/50 - 5 on weight basis.

The emulsifier is used to form the W/O emulsion of the ink, and is preferably a nonionic surfactant. As such a nonionic surfactant, mention may be made of sorbitan higher-fatty acid esters such as sorbitan monolaurate, sorbitan monopalmitate, sorbitan monostearate, sorbitan tristearate, sorbitan monooleate and sorbitan sesquioleate as well as fatty acid monoglycerides, fatty acid diglycerides, and ethylene oxide adducts of higher alcohols, alkylphenols, fatty acids or the like. It is desired that these surfactants have a HLB (hydrophile-lypophile balance) of 1.5 to 6.0, preferably 2.0 to 4.0. Within this range of HLB, it is easy to make the maximum particle size of the water phase of the emulsion ink 10 μm or less. When the HLB is lower than 1.5, surface activity is weak, and it is difficult to form a water-in-oil (W/O) emulsion. When the HLB is greater than 6.0, surface activity is high, but it is difficult to form a water-in-oil (W/O) emulsion although it can serve an emulsifier for oil-in-water (O/W) emulsions or wetting agents.

The present water-in-oil (W/O) emulsion ink can readily be made, for example, by gradually adding 90 to 30% by weight of the above mentioned water phase to 10 to 70% by weight of the above mentioned oil phase to emulsify the mixture.

EXAMPLES

Hereinafter, the present invention will be explained in more detail by way of presently preferred working examples. However, it should be understood that the present invention is not limited to the examples. In the following examples, the term "part(s)" means "part(s) by weight" unless otherwise indicated.

Examples 1–6 and Comparative Example 1–3

Using a water-insoluble colorant shown in Table 1, an aqueous dispersion composed of the water phase components shown in Table 2 or 3 was prepared. Dispersion was sufficiently effected in a ball mill. Average particle size of the water-insoluble colorant after dispersion is listed in Table 1.

An oil phase was prepared by stirring and mixing together the compositions shown in Table 2 or 3. An emulsion ink for stencil printing was obtained by gradually adding the above aqueous dispersion of the water-insoluble colorant to the oil phase under stirring.

Meanwhile, the above average particle size of the water-insoluble colorant was measured by use of a centrifugal particle size measuring apparatus CAPA-700 (manufactured by HORIBA Ltd.). Particle size of the water phase of the emulsion obtained above was measured by freezing and cutting the emulsion and measuring particles of water phase using an electron microscope JSM-5400LV (manufactured by Kabushiki Kaisha Nippon Denshi) equipped with a cryostat, and is shown in Table 4.

TABLE 1

|  | Name of pigment | Type of pigment | Average particle size (μm) |
| --- | --- | --- | --- |
| Example 1 | Naphthol Red FGR | Insoluble azo pigment | 0.15 |
| Example 2 | Brilliant Carmine BS | Insoluble azo pigment | 0.18 |
| Example 3 | Fast Yellow G | Insoluble azo pigment | 0.14 |
| Example 4 | Disazo Yellow AAA | Insoluble azo pigment | 0.12 |
| Example 5 | Permanent Orange G | Insoluble azo pigment | 0.23 |
| Example 6 | Condensed Azo Red BR | Insoluble azo pigment | 0.31 |
| Comparative Example 1 | Brilliant Carmine 6B | Soluble azo pigment | 0.21 |
| Comparative Example 2 | Lake Red C | Soluble azo piqment | 0.25 |
| Comparative Example 3 | Watchung Red | Soluble azo pigment | 0.22 |

TABLE 2

Formulations of W/O emulsion inks (parts by weight)

| Number of Examples | 1 | 2 | 3 | 4 | 5 | 6 |
|---|---|---|---|---|---|---|
| Oil phase: | | | | | | |
| Non-volatile solvent: #40 Motor oil | 18.0 | 18.0 | 18.0 | 18.0 | 18.0 | 18.0 |
| Volatile solvent: No. 5 solvent (manufactured by Nippon Oil Co. Ltd.) | 5.0 | 5.0 | 5.0 | 5.0 | 5.0 | 5.0 |
| Emulsifier: Sorbitan monooleate (HLB = 3.5) | 5.0 | 5.0 | 5.0 | 5.0 | 5.0 | 5.0 |
| Water phase: | | | | | | |
| Water-insoluble colorant: See Table 1 | 5.0 | 5.0 | 5.0 | 5.0 | 5.0 | 5.0 |
| Water: ion-exchanged water | 60.0 | 60.0 | 60.0 | 60.0 | 60.0 | 60.0 |
| Dispersant: polyvinyl pyrrolidone | 1.0 | 1.0 | 1.0 | 1.0 | 1.0 | 1.0 |
| Wetting agent: Ethylene glycol | 6.0 | 6.0 | 6.0 | 6.0 | 6.0 | 6.0 |

TABLE 3

Formulations of W/O emulsion inks (parts by weight)

| Number of Comparative Examples | 1 | 2 | 3 |
|---|---|---|---|
| Oil phase: | | | |
| Non-volatile solvent: #40 Motor oil | 18.0 | 18.0 | 18.0 |
| Volatile solvent: No. 5 solvent (manufactured by Nippon Oil Co. Ltd.) | 5.0 | 5.0 | 5.0 |
| Emulsifier: Sorbitan monooleate (HLB = 3.5) | 5.0 | 5.0 | 5.0 |
| Water phase: | | | |
| Water-insoluble colorant: See Table 1 | 5.0 | 5.0 | 5.0 |
| Water: ion-exchanged water | 60.0 | 60.0 | 60.0 |
| Dispersant: polyvinyl pyrrolidone | 1.0 | 1.0 | 1.0 |
| Wetting agent: Ethylene glycol | 6.0 | 6.0 | 6.0 |

Performance Tests

The inks were evaluated on emulsion stability, particularly heat stability and stability in use on a printing apparatus in accordance with the procedures shown below. Printing was effected by use of a stencil printing apparatus RISOGRAPH (registered trademark) GR275 (manufactured by RISO KAGAKU CORPORATION). The results are shown in Table 4.

Emulsion stability:

(1) Heat stability: After the ink was left at a constant temperature of 50° C. for six months, lowering rate of viscosity was measured in accordance with the following equation (1):

$$\text{lowering rate of viscosity} = (V1-V2)/V1 \quad (1)$$

wherein $V1$ is viscosity before the ink is left, $V2$ is viscosity after the ink is left, and viscosity was measured by a Brookfield viscometer.

(2) Stability in use on printing apparatus: The above printing apparatus was charged with the above-obtained emulsion ink, and the printing drum of the printing apparatus was wound with a stencil sheet which was not perforated. Then, the printing apparatus was operated to obtain 10,000 pieces of print. In the course of printing, the ink was not able to pass the drum because there was no perforation in the stencil sheet, and thus the ink was being sheared in the drum. Then, lowering rate of viscosity of the ink was measured in accordance with the above equation (1). When the ink was separated into the oil phase and the water phase and became unusable as an ink after printing 10,000 pieces of print, the result was shown as N.D.

TABLE 4

Results of Examples and Comparative Examples

| | Ex. 1 | Ex. 2 | Ex. 3 | Ex. 4 | Ex. 5 | Ex. 6 | C. Ex. 1 | C. Ex. 2 | C. Ex. 3 |
|---|---|---|---|---|---|---|---|---|---|
| Particle size of water phase (μm) | 0.97 | 0.89 | 0.90 | 0.86 | 0.88 | 0.96 | 0.89 | 4.25 | 4.89 |
| Emulsion Stability | | | | | | | | | |
| (1) Heat stability | 0.12 | 0.18 | 0.15 | 0.18 | 0.18 | 0.20 | N.D. | 0.38 | 0.39 |
| (2) Stability in use on printing apparatus | 0.15 | 0.21 | 0.18 | 0.22 | 0.27 | 0.26 | N.D. | 0.35 | 0.35 |

Note: "Ex." refers to Example, and "C. Ex." refers to Comparative Example. "N.D." means "not determined" due to separation of emulsion into oil phase and water phase.

From the results of Table 4, it is found that when insoluble azo-pigments are used as water-insoluble colorants, emulsions are not destructed but kept stable with little change in viscosity and about 1 μm or less of particle size of the water phase.

Since the present water-in-oil (W/O) emulsion ink employs an insoluble azo pigment as a water-insoluble colorant, it provides a stable emulsion, and the emulsion is not destructed even when it is left for a long time.

What we claim is:

1. A water-in-oil (W/O) emulsion ink for stencil printing, having an oil phase and a water phase, in which a water-insoluble colorant is contained in said water phase, said water-insoluble colorant comprising an insoluble azo pigment.

2. An emulsion ink for stencil printing according to claim 1, in which said insoluble azo pigment contained in said water phase has an average particle size of 1 μm or less.

3. An emulsion ink for stencil printing according to claim 1, in which said emulsion ink is formed by use of an emulsifier having an HLB of 1.5–6.0, and the water phase has a maximum particle diameter of 10 μm or less.

4. An emulsion printing ink for stencil printing according to claim 1, wherein said water-and-oil (W/O) emulsion ink contains 1 to 30% by weight of said water-insoluble colorant.

5. An emulsion ink for stencil printing according to claim 4, in which said water-and-oil (W/O) emulsion ink contains 3–10% by weight of said water-insoluble colorant.

6. An emulsion ink for stencil printing according to claim 1, wherein said insoluble azo ink comprises insoluble azo yellow pigments, insoluble azo orange pigments, insoluble azo red pigments, insoluble azo violet pigments, or insoluble azo brown pigments.

* * * * *